(No Model.)
E. B. MANNING.
TEA OR COFFEE POT OR OTHER VESSEL.
No. 551,933. Patented Dec. 24, 1895.
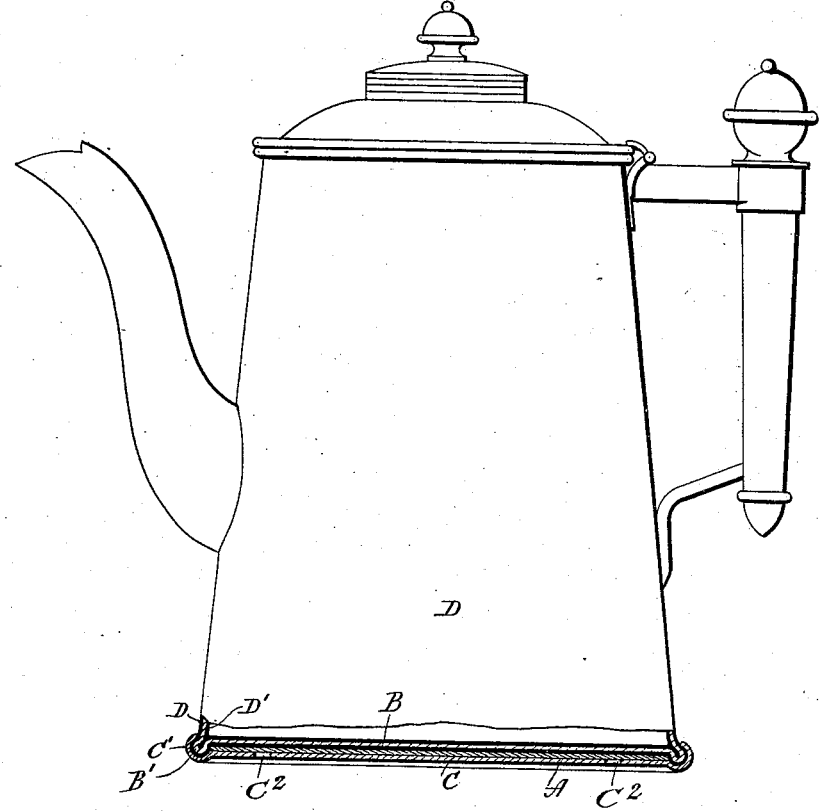
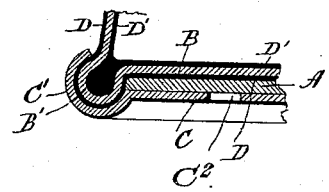

UNITED STATES PATENT OFFICE.

EDWARD B. MANNING, OF MERIDEN, CONNECTICUT, ASSIGNOR TO THE MANNING, BOWMAN & COMPANY, OF SAME PLACE.

TEA OR COFFEE POT OR OTHER VESSEL.

SPECIFICATION forming part of Letters Patent No. 551,933, dated December 24, 1895.

Application filed January 14, 1895. Serial No. 534,814. (No model.)

*To all whom it may concern:*

Be it known that I, EDWARD B. MANNING, of Meriden, in the county of New Haven and State of Connecticut, have invented a new Improvement in Tea or Coffee Pots or other Vessels; and I do hereby declare the following, when taken in connection with the accompanying drawings and the letters of reference marked thereon, to be a full, clear, and exact description of the same, and which said drawings constitute part of this specification, and represent, in—

Figure 1, a view in side elevation of a coffee-pot constructed in accordance with my invention, its lower part being shown in vertical section; Fig. 2, an enlarged broken view in vertical section, showing one corner of the bottom of the pot.

My invention relates to an improvement in tea or coffee pots or other similar vessels made of sheet metal externally and internally enameled, and generally known to the trade under the name of "granite ware."

Heretofore such vessels have been objectionable on account of the liability of the enamel on their bottoms to check, peel and chip off under the action of heat and concussion.

The object of my present invention is to overcome these objections and to produce an enameled vessel not only relieved thereof, but also improved in appearance and made more durable, and furthermore rendered more desirable in use, inasmuch as the scorching or burning of its contents is avoided.

With these ends in view my invention consists in a granite-ware tea or coffee pot or other similar enameled or vitreously-surfaced vessel having certain details of construction, as will be hereinafter described, and pointed out in the claim.

Although it is apparent that my invention may be applied to a variety of vessels, I have chosen to illustrate it in its application to a coffee-pot.

In carrying out my invention as herein shown I introduce a disk A of sheet asbestos between the bottom of the body B of the pot and the supplemental sheet-metal bottom C, the edge of which has a downwardly-projecting bead-like annular flange C', which is spun over the downwardly-projecting annular bead B' formed at the bottom of the said body, which has a continuous exterior coating D and a corresponding interior coating D' of enamel of any approved composition. The said layer of asbestos comes in direct contact with that portion of the exterior coating of enamel covering the bottom proper of the pot and covers and protects the same, while the flange C' of the supplemental bottom covers and protects that portion of the said coating covering the downwardly-projecting annular bead B' before mentioned.

Under the construction described it will be observed that the main body or central portion of the supplemental sheet-metal bottom, or, in other words, all of that portion of the bottom within its flange B', is set upward within the downwardly-projecting annular bead B' of the body of the pot in such a manner as to crowd the asbestos against the enamel on the bottom of the pot and occlude all of the air between the plate and the enamel, the space between which is exclusively occupied by the asbestos, as clearly shown by the drawings. By setting the central portion of the supplemental plate upward within the bead on the bottom of the pot, as set forth, it is given the structural rigidity, as it were, of the arch, and prevented from "buckling" or distorting under disturbing influences of whatever character, while the close confinement of the asbestos, as described, prevents the entrance of moisture and air into the space between the enamel on the bottom of the pot and the supplemental bottom, and avoids the distortion of the bottom of the pot and the sheet-metal bottom, which would result from very sudden expansion of air or moisture in the said space.

The asbestos diffuses the heat in such a manner that the enamel on the bottom of the pot is prevented from checking, peeling or chipping, and also prevents the contents of the pot from scorching or burning by diffusing and retarding the transmission of heat thereto. It also forms a cushion at the bottom of the pot for preventing the enamel from being broken in case the pot is roughly handled, for, although the enamel is protected and concealed from view, it is desirable to preserve its integrity, for in that way the metal forming the bottom of the pot is prevented from rusting. I shall preferably employ disks of asbestos cut from a sheet of the material, but I do not limit myself to the use of sheet asbestos, or asbestos in the form of disks, but may use it in a loose or flocculent form, or I may even use it in the form of heavy paint.

The supplemental bottom C holds the asbestos in place and protects the enamel on the bead at the bottom of the pot, which it also stiffens, improves in appearance, and renders more durable. If desired, the said supplemental bottom may have one or more holes $C^2$ formed in it to show the asbestos.

I would, therefore, have it understood that I do not limit myself to the exact construction herein shown and described, but hold myself at liberty to make such changes and alterations as fairly fall within the spirit and scope of my invention.

I am aware, however, that it is old to provide a sheet-metal vessel with a disk-shaped sheet-metal auxiliary bottom and to locate a layer of non-conducting material between the said bottom and the bottom proper of the vessel. I am also aware that it is old to apply a disk-shaped sheet-metal auxiliary bottom over the bottom of an earthenware vessel. I am also aware that it is old to secure such a bottom in place by spinning its edge over the bottom edge of a vessel. I am also aware that it is old to spin a sheet-metal ring or band over the bottom edge of a sheet-metal vessel having a continuous exterior coating of enamel. I do not, therefore, claim any of these constructions broadly.

Having fully described my invention, what I claim as new, and desire to secure by Letters Patent, is—

The combination with a vessel having a vitreous surface and an annular bead projecting downwardly below the bottom of its body, of a cushion of asbestos applied over the vitreous surface on the bottom of the body of the vessel so as to entirely cover and protect the said surface, and a disk-shaped supplemental plain or unenameled sheet metal bottom having an annular flange at its edge which is applied over the said downwardly projecting bead, and having its main or central portion which lies within its said flange set upward within the said bead and against the said asbestos which it tightly confines in place, and which fills the space between the said vitreous surface on the bottom of the body of the vessel and the sheet-metal supplemental bottom, substantially as and for the purpose set forth.

In testimony whereof I have signed this specification in the presence of two subscribing witnesses.

EDWARD B. MANNING.

Witnesses:
E. J. POOLEY,
A. L. STETSON.